United States Patent
Kubena et al.

(10) Patent No.: US 12,506,483 B1
(45) Date of Patent: Dec. 23, 2025

(54) SYSTEMS AND METHODS FOR TEMPERATURE COMPENSATION

(71) Applicant: HRL Laboratories, LLC, Malibu, CA (US)

(72) Inventors: Randall L. Kubena, Oak Park, CA (US); Walter S. Wall, Thousand Oaks, CA (US); Amir M. Rahimi, Santa Monica, CA (US); David T. Chang, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 29 days.

(21) Appl. No.: 18/431,902

(22) Filed: Feb. 2, 2024

(51) Int. Cl.
| | |
|---|---|
| H03L 1/04 | (2006.01) |
| G06N 3/02 | (2006.01) |
| H03B 5/04 | (2006.01) |
| H03L 1/02 | (2006.01) |

(52) U.S. Cl.
CPC ............. *H03L 1/04* (2013.01); *G06N 3/02* (2013.01); *H03B 5/04* (2013.01); *H03L 1/028* (2013.01)

(58) Field of Classification Search
CPC ... H03B 5/04; H03B 5/32; H03B 5/30; H03B 5/326; H03B 5/362; H03B 5/364; H03B 5/366; H03B 5/36; H03L 1/026; H03L 1/04; H03L 1/025; H03L 1/027; H03L 1/02; H03L 1/022; H03L 1/028; H03L 1/023; G06N 3/02; G06N 3/044; G06N 3/0442
See application file for complete search history.

(56) References Cited

U.S. PATENT DOCUMENTS

| | | | |
|---|---|---|---|
| 6,545,550 B1 * | 4/2003 | Frerking | H03L 1/026 |
| | | | 331/162 |
| 7,647,688 B1 | 1/2010 | Chang et al. | |
| 7,851,971 B2 | 12/2010 | Chang et al. | |
| 9,038,459 B1 | 5/2015 | Kubena | |
| 9,092,726 B2 | 7/2015 | Esterline | |
| 11,506,493 B1 | 11/2022 | Sorenson et al. | |
| 2019/0238092 A1 * | 8/2019 | Sudo | G06N 3/045 |
| 2023/0205253 A1 * | 6/2023 | Okusaga | G06F 1/08 |
| | | | 713/500 |

OTHER PUBLICATIONS

Vennerød, Christian Bakke, Adrian Kjærran, and Erling Stray Bugge. "Long short-term memory RNN." arXiv preprint arXiv: 2105.06756 (2021). (Year: 2021).*

Migenda, Nico, Ralf Möller, and Wolfram Schenck. "Adaptive dimensionality reduction for neural network-based online principal component analysis." PloS one 16.3 (2021): e0248896. (Year: 2021).*

Norton, J. R., "BVA-Type Quartz Oscillator for Spacecraft", Forty-Fifth Annual Symposium on Frequency Control, May 1991, pp. 426-430, IEEE.

(Continued)

*Primary Examiner* — Ryan Johnson
(74) *Attorney, Agent, or Firm* — Lewis Roca Rothgerber Christie LLP

(57) ABSTRACT

Systems and methods for temperature compensation. In some embodiments, the system includes: a clock resonator, the clock resonator including: a hermetic package; a mechanical resonator, in the hermetic package; a first temperature sensor, in the hermetic package; and a second temperature sensor, in the hermetic package.

14 Claims, 6 Drawing Sheets

(56) References Cited

OTHER PUBLICATIONS

Okusaga, O. et al., "Ultra-Stable Oscillator Stabilization using an Artificial Neural Network", 2022 Joint Conference of the European Frequency and Time Forum and IEEE International Frequency Control Symposium (EFTF/IFCS), Paris, France, Apr. 24-28, 2022, 2 pages, IEEE.
U.S. Appl. No. 18/431,899, filed Feb. 2, 2024.
Vig, J. R., "Quartz Crystal Resonators and Oscillators For Frequency Control and Timing Applications", May 1993, 273 pages.
Website: "Understanding LSTM Networks", published Aug. 27, 2015, printed Feb. 6, 2024, pp. 1-7, https://colah.github.io/posts/2015-08-Understanding-LSTMs/.

* cited by examiner

SYSTEMS AND METHODS FOR TEMPERATURE COMPENSATION

FIELD

One or more aspects of embodiments according to the present disclosure relate to precision instruments, and more particularly to systems and methods for temperature compensation.

BACKGROUND

Certain instruments, such as gyroscopes and clock oscillators, may exhibit temperature-dependent behavior, and may exhibit degraded performance in the presence of unknown or uncontrolled temperature variations.

It is with respect to this general technical environment that aspects of the present disclosure are related.

SUMMARY

According to an embodiment of the present disclosure, there is provided a system, including: a clock resonator, the clock resonator including: a hermetic package; a mechanical resonator, in the hermetic package; a first temperature sensor, in the hermetic package; and a second temperature sensor, in the hermetic package.

In some embodiments, the clock resonator includes at least three temperature sensors including the first temperature sensor and the second temperature sensor.

In some embodiments: the mechanical resonator includes: a plurality of layers; and a plurality of temperature sensors including the first temperature sensor and the second temperature sensor, and a respective temperature sensor of the temperature sensors is located on each of the layers.

In some embodiments: a respective plurality of temperature sensors of the temperature sensors is located on each of the layers; the temperature sensors on each of the layers are arranged to detect temperature differences in the azimuthal direction around the mechanical resonator.

In some embodiments: the mechanical resonator includes two layers; the first temperature sensor is on a first layer of the two layers; and the second temperature sensor is on a second layer of the two layers, the second layer being different from the first layer.

In some embodiments, the system further includes a recurrent neural network configured: to receive respective signals from the first and second temperature sensors, and to generate an output for compensating for temperature variations, thermal gradients, aging and hysteresis in the clock resonator.

In some embodiments, the recurrent neural network includes a first long short-term memory layer.

In some embodiments, the recurrent neural network further includes a dimensionality reduction stage, preceding the first long short-term memory layer.

In some embodiments, the dimensionality reduction stage utilizes principal component analysis.

In some embodiments, an output of the recurrent neural network is operatively coupled to a temperature actuator for adjusting a temperature of the clock resonator.

In some embodiments, the mechanical resonator is composed of a piezoelectric material.

According to an embodiment of the present disclosure, there is provided a system, including: a clock resonator; and a recurrent neural network, the clock resonator including: a hermetic package; a structure including two layers, in the hermetic package; a mechanical resonator, in one of the layers; a first temperature sensor, on the structure; and a second temperature sensor, on the structure, the recurrent neural network being configured: to receive a signal from the first temperature sensor and from the second temperature sensor, and to generate an output for compensating for temperature variations in the clock resonator.

In some embodiments, the recurrent neural network includes a first long short-term memory layer.

In some embodiments, the recurrent neural network includes a plurality of long short-term memory layers including the first long short-term memory layer.

In some embodiments, the product of the number of long short-term memory layers and a sampling rate of data fed to the long short-term memory layers is between 1 millisecond and 100 seconds.

In some embodiments, the recurrent neural network further includes a dimensionality reduction stage, preceding the first long short-term memory layer.

In some embodiments, the dimensionality reduction stage utilizes principal component analysis.

In some embodiments, an output of the recurrent neural network is operatively coupled to a temperature actuator for adjusting a temperature of the clock resonator.

In some embodiments, the system includes a sustaining circuit including: the clock resonator, and the recurrent neural network.

In some embodiments, the system includes: a clock oscillator including the clock resonator, and a sub-system circuit, wherein: the sub-system circuit is configured to receive a clock signal from the clock oscillator, and the sub-system circuit includes the recurrent neural network.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
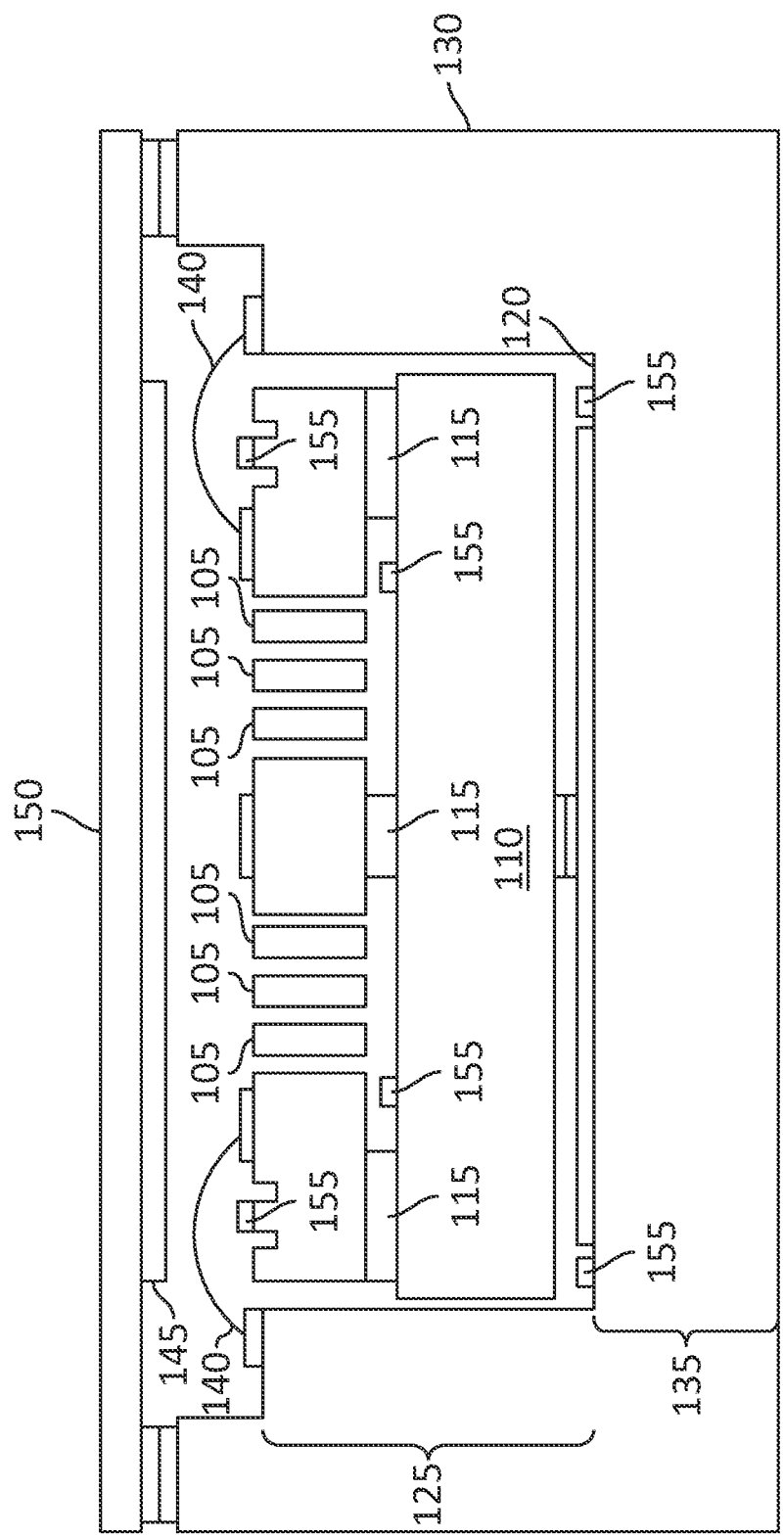
FIG. 1 is a schematic cross-sectional diagram of a portion of a gyroscope, according to an embodiment of the present disclosure.

The detailed description set forth below in connection with the appended drawings is intended as a description of exemplary embodiments of systems and methods for temperature compensation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Temperature variations (e.g., variations with time, or variations with position (e.g., temperature gradients)) may affect the performance of gyroscopes, such as micro-electromechanical system (MEMS) resonator gyroscopes. At high performance levels, physical effects such as stress variations, especially from packaging, may produce bias and scale factor drifts in a gyroscope, e.g., in a micro-electromechanical system (MEMS) resonator gyroscope. These physical effects may also manifest themselves in aging, turn-on to turn-on variations, structural fatigue, creep, and thermal hysteresis. As such, thermal gradients and packaging stress may play an important role in the stability of MEMS gyroscopes, especially for performance levels below 1 degree per hour. For navigation grade performance levels of less than 0.01 degrees per hour, small stresses induced by thermal warm-up, thermal gradients, or thermal cycling may produce sizeable shifts in the gyroscope output bias and scale factor. Simple thermal look-up tables for temperature compensation or frequency locking to a stable oscillator may not be sufficient to capture all the physics determining the bias stability, depending on the type of construction and packaging used for the gyroscope. Thus, it may be beneficial to capture additional factors that contribute to bias and scale factor instabilities using additional sensors coupled to neural network or other artificial intelligence (AI) algorithms and proper training. Advances in dedicated digital signal processors and memory have reduced the size and power that are needed for such computations. Since digital signal processors are commonly utilized within an inertial measurement unit (IMU) for navigational guidance calculations or Kalman filtering operations, the additional system size, weight, and power (SWaP) for neural network or AI calculations may be minimal. Furthermore, IMUs may be integrated into larger subsystems and systems with their own digital processing capability allowing the necessary memory and computations to be handled at the system level where larger computing margins exist, reducing the need for additional physical computing hardware.

Temperature variations (e.g., variations with time, or variations with position (e.g., temperature gradients)) may also affect the performance of clock oscillators, such as quartz oscillators. Good long-term stability of clocks may be advantageous for long holdover applications in which timing synchronization among communication or radar nodes may be employed. This may be especially important in global positioning system (GPS)-denied environments. For some applications in which GPS signals could be disrupted for several days, maintaining communication timing synchronization within 1 microsecond may be advantageous. Such a timing requirement may be present in cellular wireless communication systems or military networks. For other applications, particularly for coherent radar synchronization of multiple platforms above 20 GHZ, 10 ps timing accuracy, over several minutes, may be advantageous.

FIG. 1 shows a schematic cross-sectional diagram of a silicon disk resonator gyroscope (DRG). The silicon resonator (which may be a mechanical resonator) is a doped silicon wafer with rings 105 etched through the wafer with deep reactive ion etching (DRIE). Each ring may be supported by a plurality of spokes (which are not shown in FIG. 1, e.g., because they do not pass through the cutting plane defining the cross section of FIG. 1). The resonator resonates in a wine-glass mode with capacitive drive and sense electrodes located on the perimeter, which may operate as (i) one or more actuators, for applying force to a portion of the mechanical resonator, and (ii) one or more position sensors, for sensing the position of a portion of the mechanical resonator. The wafer including the resonator rings 105 is bonded to a silicon substrate wafer 110 with oxide bonds 115. The silicon substrate wafer 110 is bonded using a gold-tin (Au/Sn) alloy or an adhesive bond to the bottom surface 120 of an internal cavity 125 of a ceramic package 130. The bottom surface 120 of the internal cavity 125 may be the top surface of the lower portion 135 of the ceramic package 130. Wire bonds 140 are used for making electrical connections between the package and resonator. Once the contents of the ceramic package 130 have been installed, a getter 145 in the lid of the package may be annealed, and the lid 150 may be sealed in a vacuum to yield a sub-millitorr (mT) vacuum. The getter 145 may be composed of titanium, or of a suitable alloy, and may absorb nitrogen, oxygen, or water molecules.

One or more temperature sensors 155 may be located on the three layers, i.e., on the resonator layer which includes the rings 105, on the silicon substrate wafer 110, and on the bottom surface 120 of the internal cavity 125 on which the silicon substrate wafer 110 is mounted. The temperature sensors 155 may also be located (azimuthally) around the perimeter of the circular resonator in several sections. These temperature sensors 155 may be, e.g., thermocouples, resistance temperature detectors (RTDs), thermistors, diodes, or semiconductor-based integrated circuits (ICs). The temperature sensors 155 may have sensitivities in the few to tens of millikelvin (mK). By averaging all the sensors together, an average temperature of the resonator may be calculated. However, by also monitoring the temperature differences between the sensors a more detailed thermal distribution may be obtained which may provide information on thermally induced stresses. Azimuthal distributions (e.g., azimuthal temperature variations) due to packaging and internal bonding and mounting geometries may also be monitored. Such three-dimensional temperature data within the package may provide spatially detailed and rapidly updated information on resonator stresses that may affect bias drift. FIG. 1 shows examples of positions (i.e., the height and the radius (the distance from the central axis)) at which the temperature sensors 155 may be positioned; in some embodiments temperature sensors 155 are present at a plurality of azimuthal positions (e.g., between 2 and 20 azimuthal positions) for each of the positions shown in FIG. 1. In some embodiments temperature sensors 155 are further present in other positions not shown in FIG. 1 (e.g., in positions different from the ones at which FIG. 1 shows temperature sensors 155).

Each temperature sensor which is on the resonator layer or on the silicon substrate wafer 110 may be integrated with the mechanical resonator structure, e.g., it may be fabricated in place (instead of being separately fabricated and bonded in place). For example, a resistance temperature detector may be fabricated by depositing a platinum trace on the resonator layer or on the silicon substrate wafer 110. The resistance of this platinum trace may change with temperature. Two or more (e.g., four) connections may be made to the platinum trace for the purpose of measuring the resistance. When two conductors are used, these conductors may be constructed to have significantly lower resistance than the platinum trace (e.g., the conductors may be traces that are composed of gold, or that have a greater width or thickness than the platinum trace). In some embodiments, four conductors may be used, two of which are used to drive a current through the platinum trace and the other two of which are used to measure the resulting voltage drop across the platinum trace, or across a portion of the platinum trace. As used herein, an "integrated" temperature sensor is one that is fabricated in place by deposition or implantation (e.g., ion implantation).

Interconnects (e.g., connections to the exterior of the ceramic package 130) in this embodiment may be made from the resonator layer which includes the rings 105 through wire bonds 140 to wire bond pads on the interior surface of the ceramic package 130 as shown in FIG. 1. For temperature sensors 155 on the silicon substrate wafer 110, connections may be made, using conductive traces on the top surface of the silicon substrate wafer 110, from the temperature sensors 155 to wire bond pads at the edge of the top surface of the silicon substrate wafer 110, and by wire bonds from the wire bond pads on the top surface of the silicon substrate wafer 110 to wire bond pads on the interior surface of the ceramic package 130. In such an embodiment the silicon substrate wafer 110 may extend radially out past the resonator layer far enough to provide access to such wire bond pads on the top surface of the silicon substrate wafer 110.

For temperature sensors 155 on the bottom surface 120 of the internal cavity 125, connections may be made through wire bonds 140 to wire bond pads on the bottom surface 120 of the internal cavity 125, or temperature sensors 155 each having two terminals on its bottom surface may be soldered to conductive traces on the bottom surface 120 of the internal cavity 125. In each case, connections from the interior surface of the ceramic package 130 to the exterior of the ceramic package 130 may be made using package interconnects (which may be conductors extending through the wall of the ceramic package 130). For example, the ceramic package 130 may be constructed as a multi-layer structure including layers with conductive traces and dielectric ceramic layers; in such an embodiment the layers with conductive traces may provide conductive paths, between the interior of the ceramic package 130 and the exterior of the ceramic package 130, which may be used to form connections to the temperature sensors 155.

Figure 2:
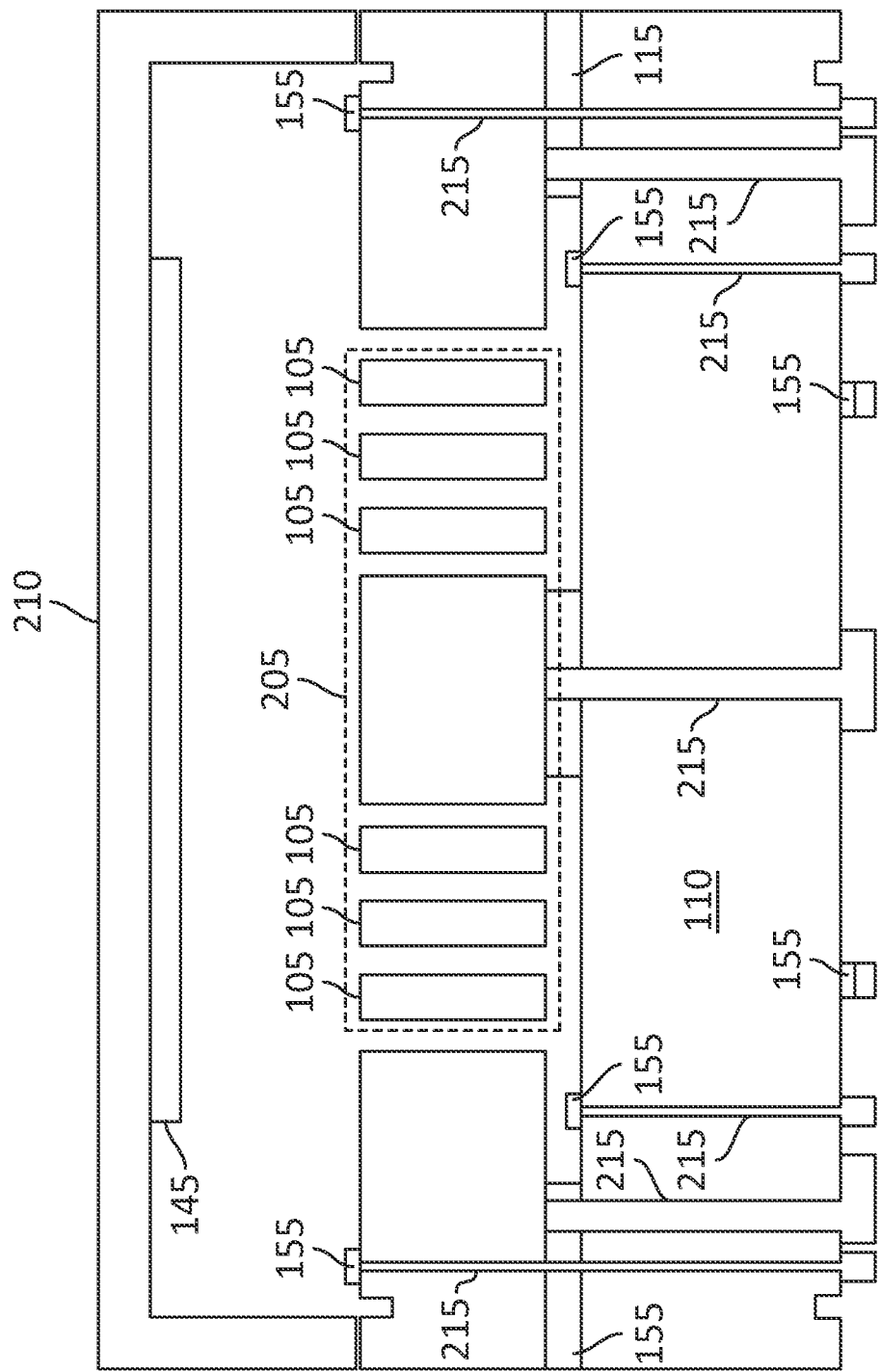
FIG. 2 is a schematic cross-sectional diagram of a portion of a gyroscope, according to an embodiment of the present disclosure.

A second packaging embodiment is shown in FIG. 2. In this embodiment, the resonator structure 205 is vacuum sealed at wafer level using a silicon capping wafer 210 before die singulation. Through wafer vias 215 are used to bring the electrical interconnects to the bottom surface of the bottom silicon substrate wafer 110 for bonding to an active substrate or printed circuit board (PCB). The resonator rings 105 may be supported by ribs, as in the embodiment of FIG. 1. In both the embodiment of FIG. 1 and the embodiment of FIG. 2, electronic components, e.g., preamplifiers or analog to digital converters, for amplifying the signals from the temperature sensors 155 or converting the signals from analog form to digital form, may be inside the ceramic package 130 (e.g., fabricated on the silicon substrate wafer 110, which, in such an embodiment, may be referred to as an active substrate).

Figure 3:
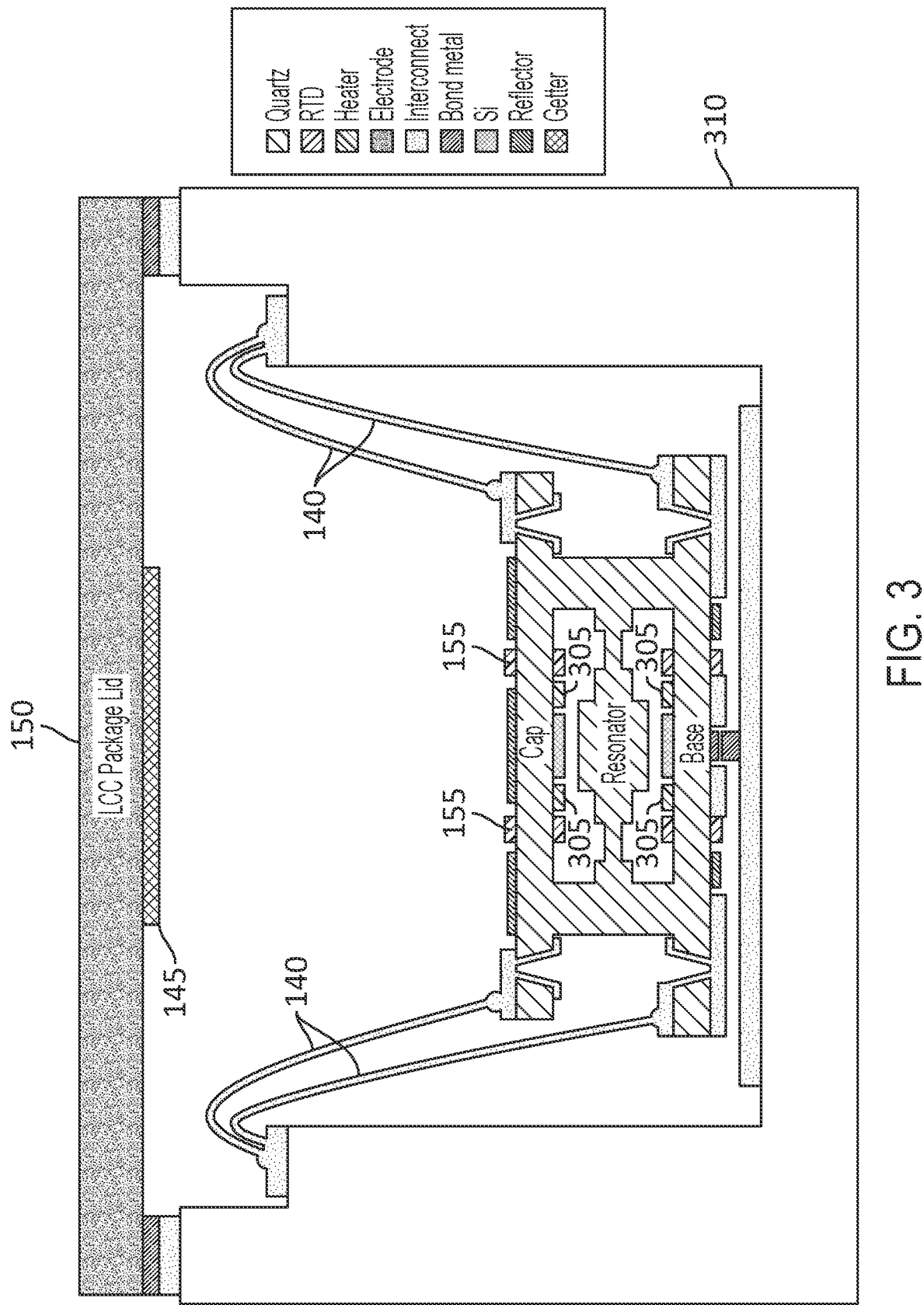
FIG. 3 is a schematic cross-sectional diagram of a portion of a clock resonator, according to an embodiment of the present disclosure.

As mentioned above, temperature sensing and compensation may also be employed to improve the performance of a clock oscillator, e.g., by improving the stability of a resonator (e.g., a quartz resonator, or a resonator composed of another piezoelectric material, e.g., aluminum nitride, gallium nitride, or lead zirconate titanate (PZT)) used in a high-stability clock oscillator. A cross-section of a MEMS-based clock resonator with integrated temperature sensors and heaters is shown in FIG. 3. No deposited metal is used on the resonator wafer itself to minimize stress relief and creep which may contribute to aging and hysteresis. The mesas for modal confinement and spring isolation (for bonding stress relief) may be etched into a quartz wafer using deep trench reactive ion etching. A staircase etch may be used to create a resonator that has the greatest thickness in the middle and is thinner at the edges. The quartz wafer may be either AT-cut or SC-cut quartz (where AT refers to temperature compensated cut and SC refers to a stress compensated cut), thereby providing different starting temperature profiles depending on how the clock is used and its performance requirements. Using an AT-cut resonator may require the least local heating, power, and fastest warm-up times for most applications. However, an SC-cut resonator with local heating to a turn-over point in the frequency/temperature profile may be used for potentially better performance. The wafers are bonded (e.g., with a fusion bond) at temperatures less than 450 degrees Celsius to prevent quartz twinning. The wafers are then sawed to singulate the individual die.

The temperature sensors 155 may be located on the top and bottom surfaces of the cap and base quartz wafers, as shown, thereby monitoring the temperature gradients across the cap wafer, across the base wafer, and between the cap and base wafers. Since the temperature sensors are located within the quartz resonator structure and inside the vacuum housing, the thermal response time is significantly reduced compared to having the sensors located outside the vacuum package. This will yield more accurate compensation data.

The entire housing may be made of similar cuts of crystalline quartz for stress mitigation over temperature. The temperature sensors may also be placed around the perimeter of a circular resonator. Thus, both vertical and azimuthal temperature gradients between the quartz housing substrates may be monitored. Like the temperature sensors 155 of the embodiments of FIGS. 1 and 2, (i) the temperature sensors 155 of the embodiment of FIG. 3 may be constructed as thermocouples, resistance temperature detectors (RTDs), diodes, thermistors, or integrated circuit temperature sensors, and (ii) the temperature sensors 155 may be located at various azimuthal positions around the perimeter of the device out of the plane of the drawing. The temperature sensors 155 may have sensitivities in the few to tens of millikelvin. By averaging all the sensors together, an average temperature of the resonator may be calculated. However, by monitoring the temperature differences between the sensors, a more detailed thermal distribution may be obtained which may provide information on temperature gradients which contribute to thermally induced stresses. Azimuthal temperature distributions, which may be non-uniform due to packaging and internal bonding and mounting geometries, may also be monitored. Such information on temperature distributions within the housing may provide spatial detail, with low latency of temperatures and temperature differences that may cause resonator stresses that, in turn, may affect aging and hysteresis.

Temperature actuators, e.g., heater elements 305, may be used in conjunction with recurrent neural network compensation to reduce temperature instabilities. By using a quartz cut that exhibits a low frequency sensitivity to temperature at a particular temperature (a turnover point), the heaters may be used to ovenize the resonator around a set point. For example, SC-cut quartz resonators may have turnover points near 90 degrees Celsius. As discussed below, a neural network (e.g., a recurrent neural network) and associated servo control electronics to the heaters may be used to 1) control the average temperature at a set point, 2) control temperature gradients, and 3) compensate for the temperature gradients. The frequency compensation may be accomplished by applying voltages to a varactor diode in series with the resonator for shifting the series resonance or by digital synthesis methods. Using heaters in addition to neural network-based compensation may increase the power consumption but may provide greater stability and reduced pre-compensated hysteresis. Vacuum may be provided at the wafer level or at the package level (or both).

Figure 4B:
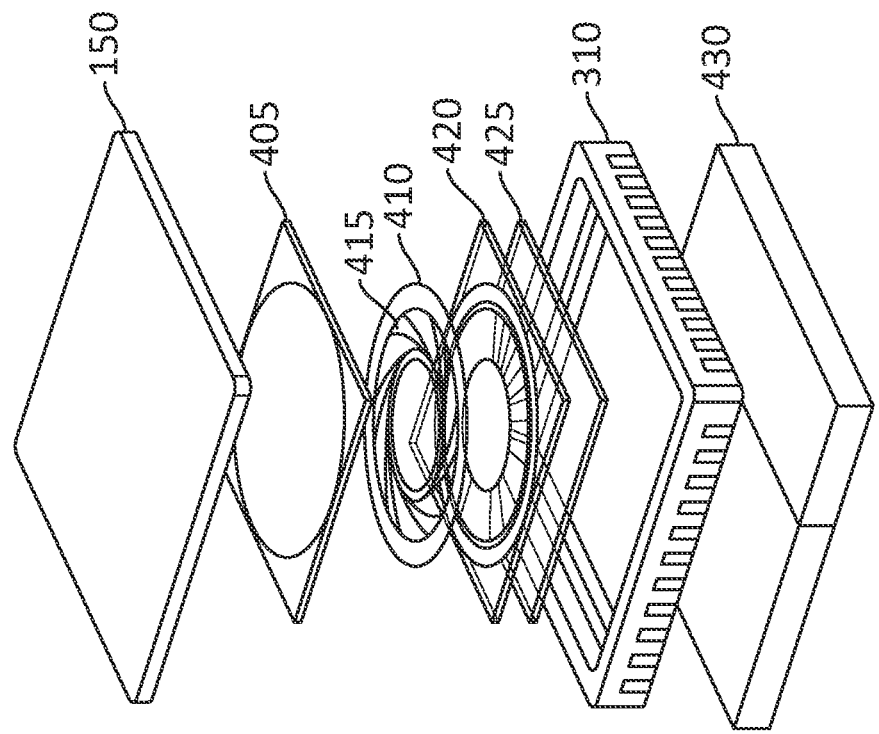
FIG. 4B is an exploded perspective drawing of a packaged portion of a clock resonator, according to an embodiment of the present disclosure.
Figure 4A:
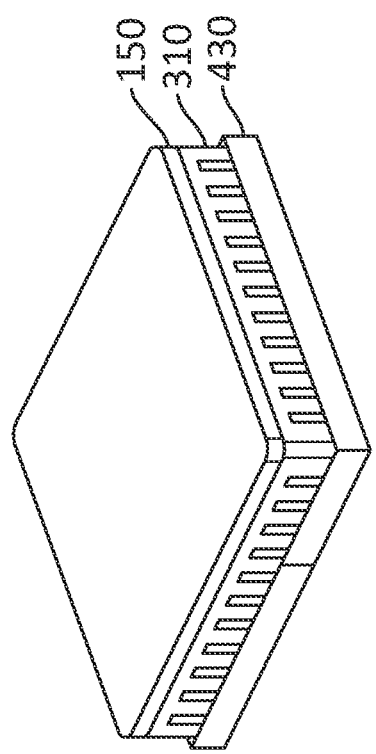
FIG. 4A is a perspective drawing of a packaged portion of a clock resonator, according to an embodiment of the present disclosure.

FIG. 4A shows a perspective view of the interior of the package 310 for the quartz clock, and FIG. 4B shows a perspective exploded view of the package 310. FIGS. 4A and 4B are drawn to scale, for respective embodiments. The package 310 may include a leadless chip carrier (LCC) or similar package which may be used to form a vacuum environment for the resonator. Interconnects (e.g., connections to the exterior of the package 310) may be made through wire bonding to wire bond pads on the interior of the package 310; these wire bond pads may be connected, by conductors extending through the walls or base of the package 310, to external contacts of the package 310. A getter 145 may be added to the lid of the package 310 for achieving sub-mT vacuum; this getter 145 may be activated in a vacuum prior to lid sealing. Optional infrared reflectors (such as Au thin-film layers) may be added to the top and bottom surfaces of the cap and base wafer for reducing the power requirements, or they may be added to the underside of the LCC package lid 150 and the upward-facing surface of the LCC cavity bottom. In some embodiments, wafer-level vacuum sealing may be employed instead of or in addition to package-level vacuum sealing, which is shown in FIG. 4B. FIG. 4B shows the lid 150, the cap quartz 405, the resonator quartz 410 (and the isolation springs 415), the base quartz 420, an interposer 425, the LCC package 310 and a recurrent neural network circuit 430 (e.g., an application specific integrated circuit (ASIC) which includes a digital signal processor (DSP) for performing neural network inference operations).

In each of the embodiments of FIGS. 1-4B, signals from the temperature sensors may be fed to a neural network, and the output of the neural network may be used to perform temperature compensation (e.g., to reduce instrument errors due to temperature variations). The outputs of the temperature sensors 155 may be (i) processed by a circuit on an active substrate (e.g., a silicon substrate (such as the silicon substrate wafer 110) on which an integrated circuit (e.g., a complementary metal oxide semiconductor (CMOS) integrated circuit may be fabricated) or by one or more integrated circuits inside or outside the package 130, 310 and (ii) transmitted to a field-programmable gate array (FPGA) or digital signal processor (DSP) for neural network (e.g., recurrent neural network (RNN)) or other artificial intelligence processing. An integrated circuit 430 is shown in FIG. 4 bonded to the underside of the package 310 containing the resonator.

In some embodiments, a long short-term memory (LSTM) neural network, (which may be an example of a recurrent neural network) is employed. A long short-term memory neural network may be a special kind of recurrent neural network in which information is stored from long and short periods of observed times in the past. A long short-term memory neural network may be capable of effectively modeling sequential data, such as compensation for aging and hysteresis effects. This may be due to the presence of memory cells in the long short-term memory neural network architecture, which allow for the preservation of important information over time while discarding irrelevant data. The long short-term memory neural network architecture may receive, as input, a sequence of samples from the temperature sensors and predict a temperature compensation value (e.g., a frequency correction for a clock oscillator or a bias correction for a gyroscope).

Figure 5:
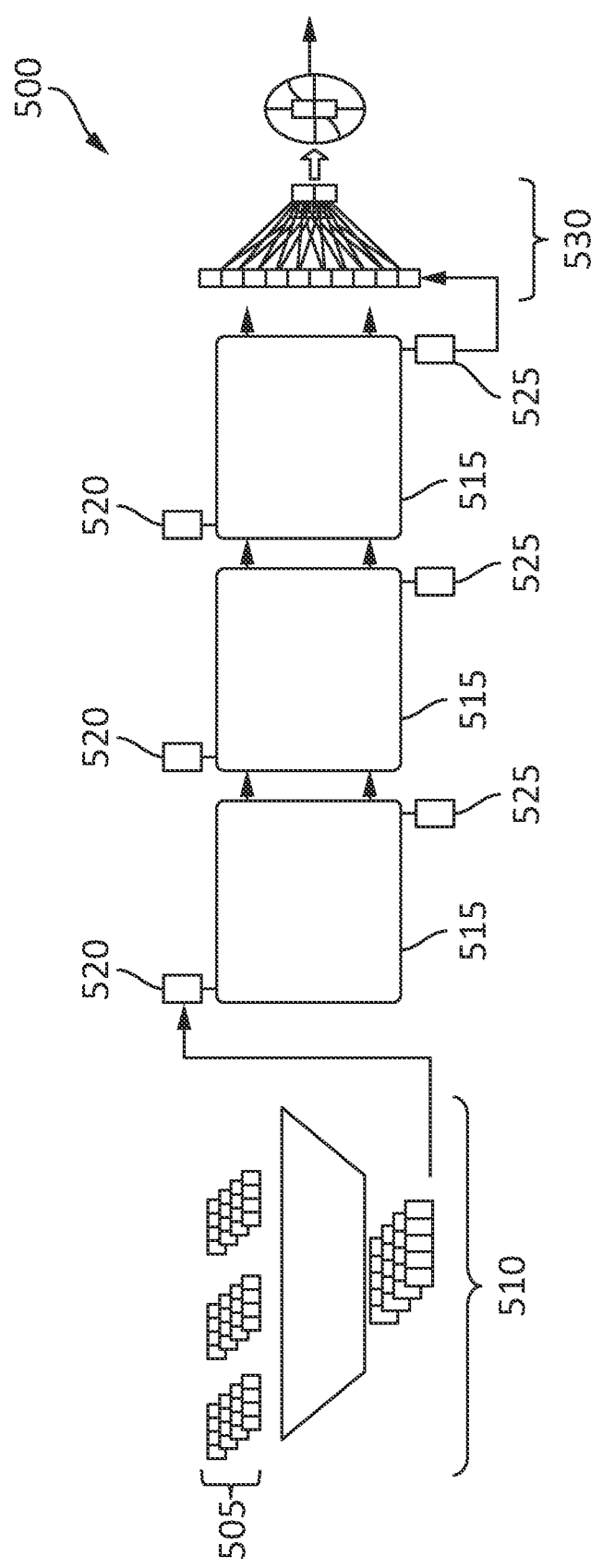
FIG. 5 is a block diagram of a neural network, according to an embodiment of the present disclosure.

FIG. 5 shows an overall block diagram of such a neural network 500, in some embodiments. The input data 505 may include sets of samples from the temperature sensors 155 (each set including a sample from each of the temperature sensors 155). Each set of samples from the temperature sensors 155 may be time-stamped. The preprocessing stage 510 may involve reducing the dimensionality of the data using principal component analysis (PCA). The sampling rate at the output of the preprocessing stage 510 may be the same as or less than the sampling rate at the input of the preprocessing stage 510. The size of each output vector of the preprocessing stage 510 may be less than the size of each input vector of the preprocessing stage 510, as a result of the dimensionality reduction performed by the preprocessing stage 510. The product of the number of long short-term memory layers and the sampling rate of data fed to the long short-term memory layers (e.g., the sampling rate at the output of the preprocessing stage 510) may be approximately equal to the longest time constant of the instrument, e.g., it may be between 1 millisecond and 100 seconds.

The mapped features at the output of the preprocessing stage 510 may then flow through a recurrent structure with long short-term memory layers 515 in each of which the flow of information is regulated by a sigmoid forget gate layer and a tanh layer that enables selective information flow. Each long short-term memory layer 515 may have an input 520 (connected to the output of the preprocessing stage 510; this connection is explicitly shown only for the first long short-term memory layer 515) and an output 525. The output 525 of each long short-term memory layer 515 may be connected to a respective input of a linear classifier layer 530 (this connection is explicitly shown only for the last long short-term memory layer 515). In the linear classifier layer 530, the output feature is passed through a softmax layer. The softmax layer takes the LSTM output feature vector and converts it to a probability distribution which will be used to select a proper compensation value (e.g., to predict a frequency or rate error, which may then be used to correct the raw frequency or rate produced by the oscillator or gyroscope, or to perform compensation in some other manner, as discussed in further detail below). The neural network may be implemented, for example, in an ASIC or in an FPGA. The sequence length, number of memory cells, learning rate, batch size, and number of epochs of the neural network 500 may be adjusted based on the characteristics of the instrument for which temperature compensation is being performed. In some embodiments, a generative pre-trained transformer (GPT) neural network may be used instead of (or in addition to) the long short-term memory layers 515. GPT models, originally designed for processing sequential data like text, can be adapted for temporal modeling due to their inherent ability to handle sequences. Key adaptations include encoding time information in the input and fine-tuning the model with the compensation data. Compared with the gated information flow in the LSTM approach, a GPT model has a causal attention mechanism to capture temporal dependencies, making them suitable for tasks like forecasting, anomaly detection, event prediction, and temporal classification. When training the LSTM networks, the batch size refers to the number of samples processed before the model updates its weights, with smaller batches offering more frequent updates but potentially less stable learning. An epoch is a complete pass through the entire training dataset (one cycle), involving as many iterations as needed to use all samples given the batch size. The sequence length specifies the length of the input sequences in time. This is the number of time steps that the network considers at once, which may be important for understanding temporal or sequential dependencies. Together, these parameters shape the learning process, influencing training speed, memory usage, and the model's ability to capture sequential patterns between the temperature readings.

Figure 6:
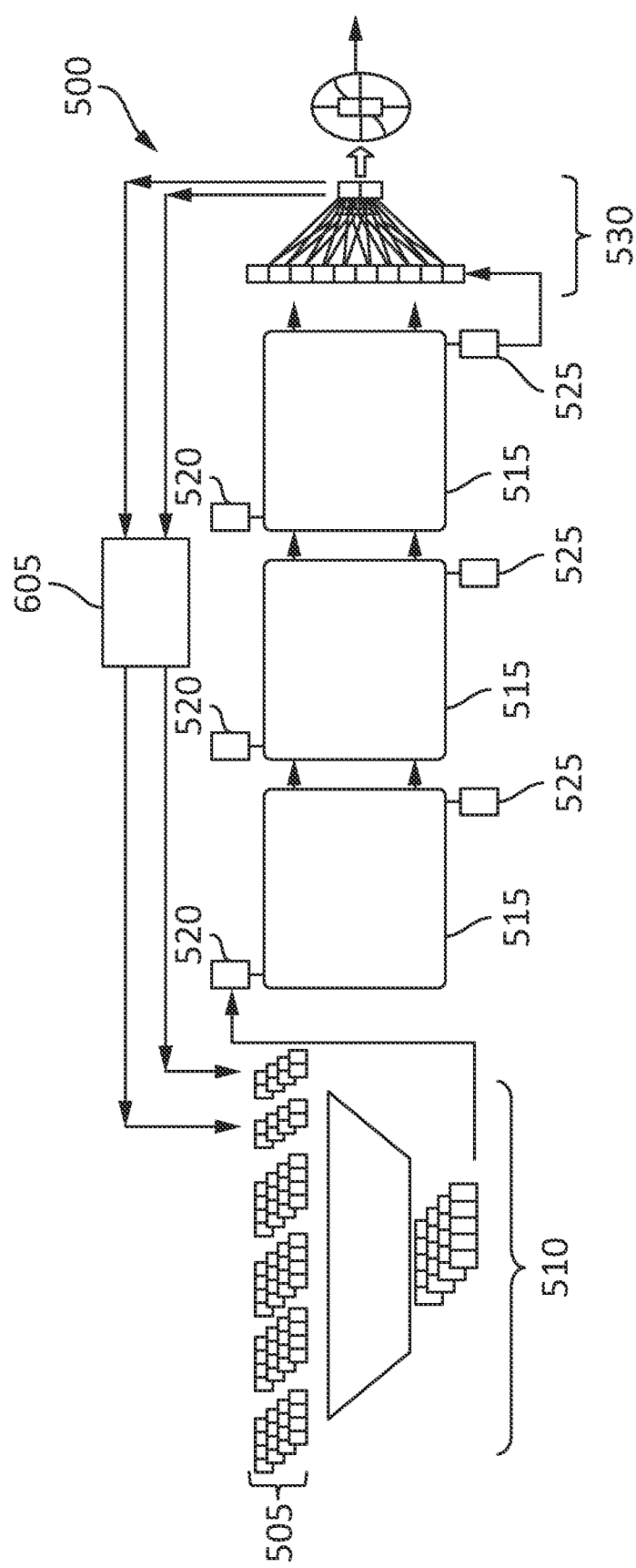
FIG. 6 is a block diagram of a neural network including feedback for one or more heaters, according to an embodiment of the present disclosure.

Temperature compensation may be performed, based on the output of the neural network 500, in various ways. In some embodiments, as illustrated in FIG. 6, the neural network 500 is operatively coupled to one or more heaters 305 (not shown in FIG. 6), e.g., the output of the neural network 500 drives a heater controller and servo circuit 605, which drives heaters 305 in the instrument (not shown in FIG. 6) (e.g., in the clock resonator, or in a gyroscope equipped with heaters 305). The heater current values may also be used as additional inputs to the neural network 500, as illustrated in FIG. 6. The heater currents may be driven so as to change the average temperature of the instrument (e.g., with the same current or proportional currents being driven through all of the heaters 305) or the heater currents may be driven with current values individually controlled by the neural network 500 (which, in such an embodiment, may for example control the heaters so as to reduce temperature gradients in the instrument). In other embodiments, the output of the neural network 500 may be used to perform temperature compensation (i) in a clock oscillator by frequency pulling or synthesizer techniques, or (ii) in a gyroscope by changing the gyroscope rate bias or scale factor.

In some embodiments, additional inputs, e.g., a power cycling indicator, may be fed to the neural network 500 to allow it to detect, e.g., power cycling, and to compensate for the effects, of the additional inputs, that it may have learned.

The neural network may be trained, using supervised training, (i) over multiple cycles of turn-on to turn-on, (ii) during temperature ramping, and (iii) over time in a thermally controlled oven or on a rate table. Such training may initially be performed with one device or with a few devices to obtain a baseline set of weights; these weights may then be used as the initial weights for further training (if any further training is to be performed) with each individual device that is manufactured.

While a quartz-based resonator with low aging is described here, many other resonator designs in material such as Si, SiC, or AlN, may be constructed with integrated temperature and heater elements and may use an analogous neural network compensation method to improve long-term stability.

In an embodiment with (i) a circuit (which may be referred to as a "sustaining circuit") that includes the clock oscillator and supplies a clock signal and (ii) a circuit (or "sub-system circuit") that uses the clock signal (e.g., a communications system or a radar system), the temperature compensation may be performed by, or within, the sustaining circuit, or by, or within, the sub-system circuit. If the temperature compensation is performed by, or within, the sustaining circuit, the additional electronics for the neural network for temperature compensation may be part of the resonator and oscillator sustaining circuit and packaged as a complete compensated clock with a precise pulse-per-second (pps) output. Such an embodiment may provide a universal clock but at the expense of higher cost, size, weight and power. If the temperature compensation is performed by, or within, the sub-system circuit, the temperature data from the temperature sensors 155 of the resonator and the uncompensated oscillator output may be transferred to the sub-system level of the sub-system circuit (e.g., of a communication or radar system) for neural network compensation using an FPGA or a DSP that may also be used for other system-level processing. In such an embodiment, the added cost, size, weight and power for the neural compensation may be reduced because this compensation is performed with existing electronics. Such an embodiment may allow for a convenient change-out of existing oscillators used in commercial systems after the neural network algorithms are added to existing FPGAs or DSPs.

Similarly, in an embodiment with a circuit (which may be referred to as a "control circuit) that includes the gyroscope and a circuit (or "sub-system circuit") that uses a rate signal (e.g., a central guidance navigation unit), the temperature compensation may be performed by, or within, the control circuit, or by, or within, the sub-system circuit. In one embodiment, the data from the temperature sensors 155 is passed to a local embedded processing unit such as an ASIC or FPGA in the control circuit and processed to generate a compensating oven control signal to mitigate drift in the resonator. One advantage of this technique may be that because the additional processing for implementation occurs at the level of the control circuit, the interfaces between the control circuit and the sub-system circuit (e.g., the guidance navigation unit) hosting the control circuit may be virtually identical to those of a conventional gyroscope. However, the algorithms and processing employed by the neural network may exceed the memory or computing capacity of the processor embedded in some gyroscopes. As such, in some embodiments, temperature data from the integrated temperature sensors 155 is passed to the sub-system circuit along with the gyroscope rate output. In such an embodiment, the temperature data may be used to compensate gyroscope outputs in post processing at the sub-system level or may be handled in further downstream processing for example as a direct input to a Kalman filter. The correction signal generated by the neural network may then be used to correct the output of the Kalman filter. One advantage of this technique may be that the size, weight, and power of embedded processors at the gyroscope level may be held small while taking advantage of the larger processing capabilities that may be present at the sub-system or system level.

In some embodiments, a temperature-compensated gyroscope as disclosed herein may provide positioning accuracy of three meters or better, five minutes after an absolute position signal (e.g., a global positioning system (GPS) signal) is lost. In some embodiments, the performance of a clock based on a temperature compensated clock resonator as disclosed herein may include an Allan deviation (ADEV) of 10-14 or less at 1000 seconds and an Allan deviation (ADEV) at 106 seconds of less than 10-12. This may be accomplished with power consumption of less than 250 mW and a volume of 1 cubic centimeter or less.

According to an embodiment of the present disclosure, there is provided a mechanical resonant mode gyroscope that is stabilized using two or more integrated temperature sensors within the gyroscope vacuum enclosure, the temperature sensors providing input to a multi-input neural network for temperature compensation of the gyroscope. In some embodiments, the neural network contains a long short-term memory layer and a clock input for compensating hysteresis, turn-on to turn-on bias instabilities, and aging. In some embodiments, a neural network is used to compensate for scale factor instabilities. In some embodiments, the gyroscope consists of a MEMS resonator with associated drive and sense electronics. In some embodiments, the MEMS resonator is a Si disk resonator gyroscope. In some embodiments, digital signal processing for the compensation is performed in the processor for an IMU thereby minimizing size and power.

According to an embodiment of the present disclosure, there is provided a mechanical resonant mode clock that is stabilized using two or more integrated temperature sensors within the resonator vacuum enclosure, the temperature sensors providing input to a multi-input neural network for temperature compensation of the clock. In some embodiments, the neural network contains a long short-term memory layer and a clock input for compensating hysteresis, retrace instabilities, and aging. In some embodiments, the neural network is also used to apply heater currents to local heaters for optimizing the clock stability before additional compensation is applied electronically. In this case, the range of compensation to be performed electronically is reduced, thereby increasing the resolution achievable for the electronic compensation. In some embodiments, the local heaters are used to control the temperature of the resonator near a turn-over point in its frequency-temperature profile. In some embodiments, the neural network compensation is performed in digital electronics used for other system processing. In some embodiments, the resonator consists of a MEMS resonator with associated drive and sense electronics. In some embodiments, the MEMS resonator is a Si, SiC, AlN-based, or quartz resonator. In some embodiments, the MEMS resonator is a quartz Boitier a Vieillissement Amelioré (BVA) resonator design with metal electrodes located on a quartz housing. In some embodiments, the neural network applies a compensating signal to an analog or digital controller that adjusts the frequency of the clock. In some embodiments, the analog controller consists of a varactor diode in series or parallel with the resonator for pulling the resonator's series resonant frequency. In some embodiments, the output of the neural network is used to digitally control a frequency synthesizer for adjusting the clock output frequency.

According to an embodiment of the present disclosure, there is provided a method of compensating a clock signal in a communication or radar system in which a mechanical resonant mode clock signal is stabilized using two or more integrated temperature sensors within the resonator vacuum enclosure, the temperature sensors providing input to a multi-input neural network for temperature compensation which is located on a DSP used for other system level signal processing. According to an embodiment of the present disclosure, there is provided a method of compensating a clock signal in a communication or radar system in which a mechanical resonant mode clock signal is stabilized using two or more integrated temperature sensors within the resonator vacuum enclosure, the temperature sensors providing input to a multi-input neural network for temperature compensation which is located on a dedicated DSP within the clock package.

As used herein, a neural network is any system (e.g., a combination of a processing circuit and suitable software) including a plurality of interconnected artificial neurons, each of which may be implemented in software or in hardware, or in some combination of software and hardware. As such, a neural network may include other processing circuits or elements, such as a circuit for dimensionality reduction.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of systems and methods for temperature compensation have been specifically described and illustrated herein, many modifications and variations will be apparent to those skilled in the art. Accordingly, it is to be understood that systems and methods for temperature compensation constructed according to principles of this disclosure may be embodied other than as specifically described herein. The invention is also defined in the following claims, and equivalents thereof.

What is claimed is:

1. A system, comprising:
   a clock resonator,
   the clock resonator comprising:
      a hermetic package;
      a mechanical resonator, in the hermetic package;
      a first temperature sensor, in the hermetic package; and
      a second temperature sensor, in the hermetic package,
   wherein:
      the mechanical resonator comprises two layers;
      the first temperature sensor is on a first layer of the two layers; and
      the second temperature sensor is on a second layer of the two layers, the second layer being different from the first layer.

2. The system of claim 1, wherein the clock resonator comprises at least three temperature sensors including the first temperature sensor and the second temperature sensor.

3. The system of claim 2, wherein:
   the mechanical resonator comprises:
      a plurality of layers; and
      a plurality of temperature sensors including the first temperature sensor and the second temperature sensor, and
   a respective temperature sensor of the temperature sensors is located on each of the layers.

4. The system of claim 3, wherein:
   a respective plurality of temperature sensors of the temperature sensors is located on each of the layers; and
   the temperature sensors on each of the layers are arranged to detect temperature differences in an azimuthal direction around the mechanical resonator.

5. The system of claim 1, further comprising a recurrent neural network configured:
   to receive respective signals from the first and second temperature sensors, and
   to generate an output for compensating for temperature variations, thermal gradients, aging and hysteresis in the clock resonator.

6. The system of claim 5, wherein the recurrent neural network comprises a first long short-term memory layer.

7. The system of claim 6, wherein the recurrent neural network further comprises a dimensionality reduction stage, preceding the first long short-term memory layer.

8. The system of claim 7, wherein the dimensionality reduction stage utilizes principal component analysis.

9. The system of claim 5, wherein an output of the recurrent neural network is operatively coupled to a temperature actuator for adjusting a temperature of the clock resonator.

10. The system of claim 1, wherein the mechanical resonator is composed of a piezoelectric material.

11. The system of claim 6, wherein the recurrent neural network comprises a plurality of long short-term memory layers including the first long short-term memory layer.

12. The system of claim 11, wherein the product of the number of long short-term memory layers and a sampling rate of data fed to the long short-term memory layers is between 1 millisecond and 100 seconds.

13. The system of claim 5, comprising a sustaining circuit comprising:
   the clock resonator, and
   the recurrent neural network.

14. The system of claim 5, comprising:
   a clock oscillator comprising the clock resonator, and
   a sub-system circuit,
   wherein:
      the sub-system circuit is configured to receive a clock signal from the clock oscillator, and
      the sub-system circuit comprises the recurrent neural network.

* * * * *